(12) United States Patent
Helmer et al.

(10) Patent No.: US 11,040,497 B2
(45) Date of Patent: Jun. 22, 2021

(54) SIDEWALL BONDER AND METHOD FOR BONDING SIDEWALLS TO THERMOPLASTIC BELTS

(71) Applicant: Laitram, L.L.C., Harahan, LA (US)

(72) Inventors: Joseph C. Helmer, River Ridge, LA (US); Gabriel Nazar, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 307 days.

(21) Appl. No.: 16/337,676

(22) PCT Filed: Sep. 19, 2017

(86) PCT No.: PCT/US2017/052167
§ 371 (c)(1),
(2) Date: Mar. 28, 2019

(87) PCT Pub. No.: WO2018/071139
PCT Pub. Date: Apr. 19, 2018

(65) Prior Publication Data
US 2020/0023594 A1    Jan. 23, 2020

Related U.S. Application Data

(60) Provisional application No. 62/406,690, filed on Oct. 11, 2016.

(51) Int. Cl.
*B29C 65/18* (2006.01)
*B29C 65/00* (2006.01)
(Continued)

(52) U.S. Cl.
CPC ............ *B29C 66/855* (2013.01); *B29C 65/18* (2013.01); *B29C 65/305* (2013.01);
(Continued)

(58) Field of Classification Search
CPC . B29C 66/885; B29C 66/8221; B29C 66/221; B29C 66/8432; B29C 66/8322;
(Continued)

(56) References Cited

U.S. PATENT DOCUMENTS 4,532,098 A * 7/1985 Campbell .............. B29D 29/06
156/137
4,716,811 A    1/1988 Johnson
(Continued)

FOREIGN PATENT DOCUMENTS

CN     1538905 A     10/2004
CN     104235265 A   12/2014
(Continued)

OTHER PUBLICATIONS

Chinese Search Report for Chinese Patent Application No. 201780062890.0, dated Oct. 14, 2020, China National Intellectual Property Administration.
(Continued)

*Primary Examiner* — Daniel McNally
(74) *Attorney, Agent, or Firm* — James T. Cronvich

(57) ABSTRACT

A bonder and a method for bonding corrugated sidewalls to a thermoplastic belt at a splice joint. Two heating jaw assemblies with complementary and confronting corrugated vertical faces clamp a thermoplastic belt to a base of the bonder with a corrugated sidewall section separated from the belt across a splice joint received in a corrugated slot formed between the confronting vertical faces. Corrugated bonding
(Continued)

strips at the bottoms of the corrugated vertical faces apply heat to melt the bottom of the sidewall section on opposite sides to bond the corrugated sidewall section to the base.

8 Claims, 4 Drawing Sheets

(51) Int. Cl.
*B29C 65/30* (2006.01)
*B29C 65/78* (2006.01)
*F16G 3/00* (2006.01)
*F16G 3/10* (2006.01)
*F16G 3/16* (2006.01)
*B29L 16/00* (2006.01)
*B29L 31/00* (2006.01)

(52) U.S. Cl.
CPC ........ *B29C 65/7844* (2013.01); *B29C 66/112* (2013.01); *B29C 66/114* (2013.01); *B29C 66/221* (2013.01); *B29C 66/71* (2013.01); *B29C 66/73921* (2013.01); *B29C 66/8221* (2013.01); *B29C 66/8322* (2013.01); *B29C 66/8432* (2013.01); *F16G 3/003* (2013.01); *F16G 3/10* (2013.01); *F16G 3/16* (2013.01); *B29L 2016/00* (2013.01); *B29L 2031/7092* (2013.01)

(58) Field of Classification Search
CPC ................ B29C 65/7844; B29C 65/18; B29L 2031/7092; B29L 2016/00; F16G 3/16; F16G 3/003
See application file for complete search history.

(56) References Cited

U.S. PATENT DOCUMENTS

| | | |
|---|---|---|
| 4,765,862 A | 8/1988 | Azuma |
| 4,867,835 A | 9/1989 | Poole |
| 8,596,622 B2 | 12/2013 | Guttenberg |
| 2006/0163042 A1 | 7/2006 | Vogt |
| 2015/0068669 A1* | 3/2015 | Cancienne, Jr. .... B29C 66/1142 156/157 |

FOREIGN PATENT DOCUMENTS

| | | | |
|---|---|---|---|
| CN | 104245283 A | 12/2014 | |
| CN | 104520213 A | 4/2015 | |
| CN | 105818775 A | 8/2016 | |
| DE | 102005034220 A1 | 1/2007 | |
| EP | 0802038 A1 * | 10/1997 | ........... B29C 66/474 |
| EP | 0802038 A1 | 10/1997 | |
| FR | 1444143 A * | 7/1966 | ........... B29C 65/103 |
| FR | 1444143 A | 7/1966 | |
| GB | 438845 A | 11/1935 | |
| JP | 2002340101 A | 11/2002 | |
| JP | 2009107124 A | 5/2009 | |
| JP | 2011126235 A | 6/2011 | |
| KR | 10-2013-0085808 A | 7/2013 | |

OTHER PUBLICATIONS

Supplementary European Search Report of European Patent Application No. 17860310, dated Apr. 22, 2020, European Patent Office, Munich, Germany.

* cited by examiner

SIDEWALL BONDER AND METHOD FOR BONDING SIDEWALLS TO THERMOPLASTIC BELTS

BACKGROUND

The invention relates to bonding tools and a method for bonding sidewalls to a thermoplastic belt at a splice joint.

Splicing presses are used to weld the butt ends of two thermoplastic conveyor belt sections together. Conventional presses include a pair of clamps, each of which holds one of the two belt sections. The clamps, which extend across the entire width of the belt sections, firmly hold the sections with the butt ends facing each other across a gap. A heating wand is moved into the gap, and the two clamps close until the butt ends of the belt sections contact opposite sides of the heating wand. As soon as the butt ends are softened or melted sufficiently by the wand's heat, the clamps are retracted so that the wand may be removed. Then the clamps are moved toward each other until the softened or melted butt ends meet. The clamps hold the butt ends together as the joint at their interface cools.

To splice a belt with corrugated sidewalls, the sidewalls must be separated from the belt sections at the butt ends to accommodate the heating wand. After the butt ends are welded together, the sidewalls have to be spliced together across the joint and their bottoms reattached to the belt. A hot-air gun or a hot iron is often used for those purposes. But the resulting joints can be inconsistent because they rely on the skill of the person manually operating the hot-air gun or the hot iron.

SUMMARY

One version of a bonder embodying features of the invention for bonding a corrugated sidewall section to the outer surface of a thermoplastic conveyor belt comprises a base and first and second heater jaws above the base. A length of a thermoplastic belt with a corrugated sidewall section separated from an outer surface of the belt rests on the base. The first and second heater jaw assemblies each have a vertical corrugated face and a heating element having a bonding strip along the bottom of the vertical corrugated face. The vertical corrugated faces of the first and second heater jaw assemblies are complementary and confronting each other across an intervening corrugated slot in which the corrugated sidewall of a conveyor belt is received. The first and second heater jaw assemblies are disposed on the outer surface of the thermoplastic belt on opposite sides of the corrugated sidewall section. A lateral pressure-applying device applies a lateral pressure against the second heater jaw assembly to push it toward the first heater jaw assembly and hold the corrugated sidewall section between the vertical corrugated faces. The heating elements of the first and second heater jaw assemblies transfer heat to the bonding strips to melt the bottom of the corrugated sidewall section on the opposite sides to bond the corrugated sidewall section to the outer surface of the thermoplastic belt.

In another aspect a method for bonding a separated section of a corrugated sidewall to a thermoplastic belt comprises: (a) clamping a thermoplastic belt between a base and a first heater jaw assembly having a corrugated vertical face with a corrugated bonding strip at the bottom against an outer surface of the thermoplastic conveyor belt inward of a corrugated sidewall; (b) pushing a sidewall section separated from the outer surface of the thermoplastic conveyor belt against the corrugated vertical; (c) pushing a second heating element jaw assembly having a corrugated vertical face confronting and complementary with the corrugated vertical face of the first heater jaw assembly and a corrugated bonding strip at the bottom to form a corrugated slot receiving the corrugated sidewall section; (d) clamping the thermoplastic belt between the base and the second heater jaw assembly against an outer surface of the thermoplastic conveyor belt outward of the corrugated sidewall; (e) applying downward pressure against the corrugated sidewall section in the corrugated slot; and (f) heating the corrugated bonding strips of the first and second heater jaw assemblies to melt the bottom of the corrugated sidewall section on both sides and bond it to the outer surface of the conveyor belt.

DETAILED DESCRIPTION

Figure 1:
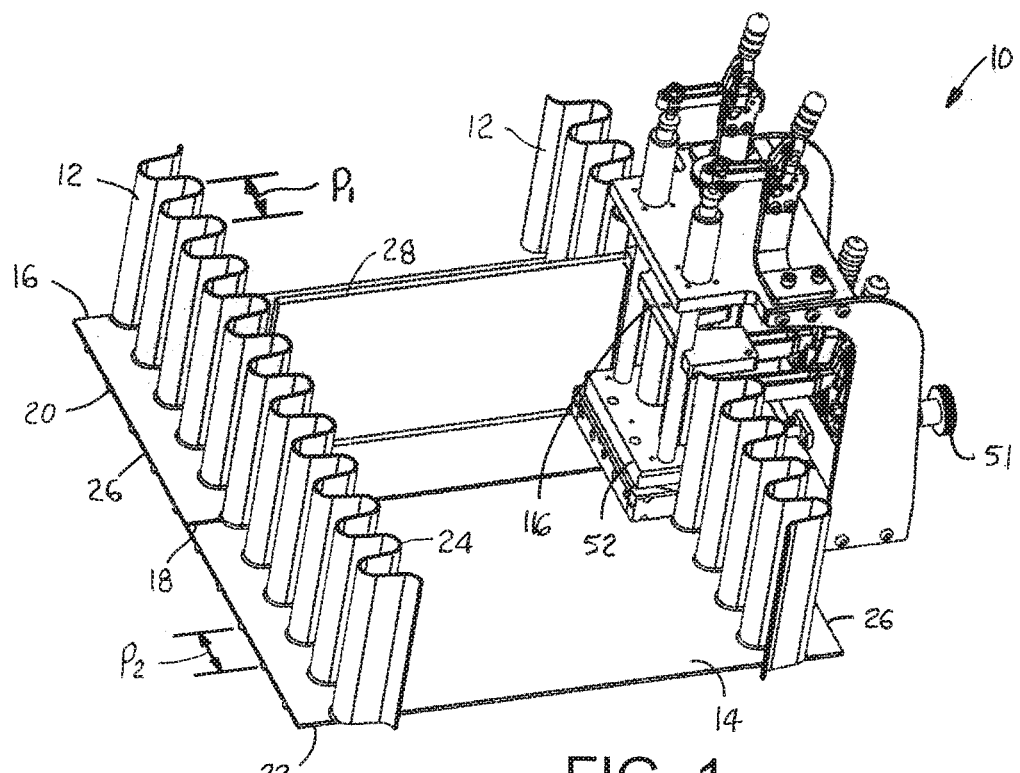
FIG. 1 is an axonometric view of a sidewall bonder embodying features of the invention operating on a synchronized corrugated-sidewall belt.

A sidewall bonder bonding a section of a sidewall to a thermoplastic conveyor belt is shown in FIG. 1. The bonder 10 is shown bonding a short length of a corrugated sidewall 12 to the outer surface 14 of a thermoplastic conveyor belt 16 in the vicinity of a splice joint 18. The belt 16 shown in this example is a homogeneous, positively driven conveyor belt made of a thermoplastic material such as polyurethane with periodically spaced drive bars 20 on the inner side 22. The corrugated sidewalls 12 of the belt 16 are synchronized in that pitch $P_1$ of the corrugations is integrally related to the pitch $P_2$ of the drive bars 20. In this example the pitches are equal, i.e., $P_1/P_2=1$. Furthermore, the peaks 24 of the sidewall pattern as viewed from above that are farther from the belt side edges 26 coincide with the drive bars 20 in this example. Thus, the closest points of approach of the two sidewalls 12 to each other occurs at the positions of the drive bars 20 along the length of the belt 16. That allows for less lengthy flights 28 to be formed on the belt 16 at the thicker drive-bar positions. But belts with other synchronized relationships are possible.

Figure 2:
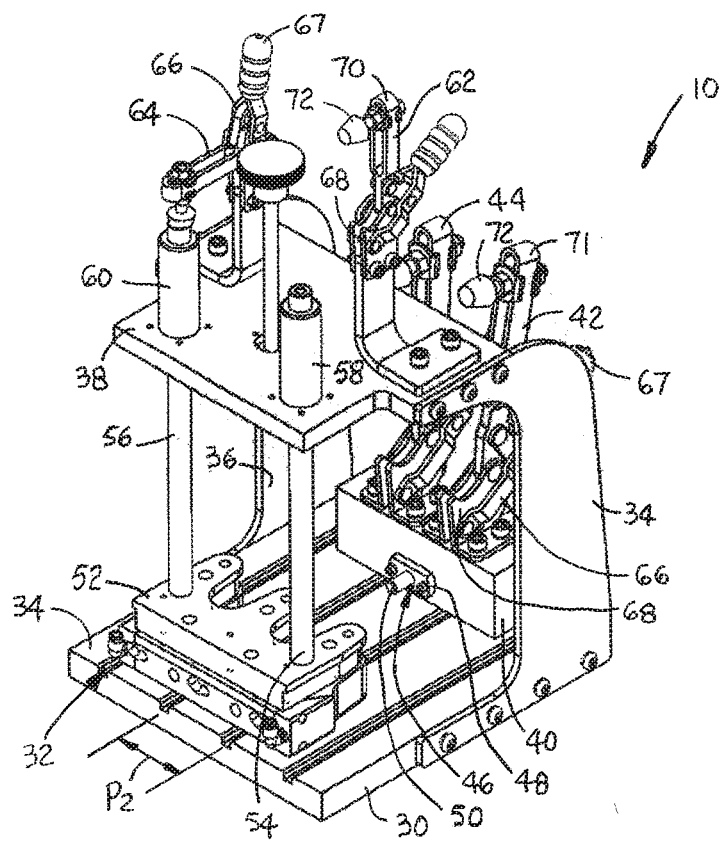
FIG. 2 is an axonometric view of the sidewall bonder of FIG. 1 in a first step of the bonding process with the belt removed for clarity.

FIGS. 2-5 show sequential steps in using the sidewall bonder 10 to bond the sidewalls of a belt as in FIG. 1 to the belt's outer surface. The belt is not shown in FIGS. 2-5 to reveal more details of the bonder 10. As shown in FIG. 2, the bonder 10 comprises a base 30 with grooves 32 in a top surface 34. The grooves 32 are spaced apart by the drive-bar pitch $P_2$ to register the spliced belt relative to the bonder components. Left and right side frames 34, 36 attached to the sides of the base 30 extend upward and support an attached top deck 38. Affixed to the base 30 between the two side frames 34, 36 is a clamp block 40. Two toggle clamps 42, 44 are mounted side by side on the top of the clamp block 40. A bore 46 extends through the clamp block 40 and through an internally threaded fitting 48. A threaded rod 50 with an adjustment knob 51 (FIG. 1) extends through the bore 46 and the fitting 48. A heater jaw assembly 52 is suspended above the base 30 by a pair of parallel posts 54, 56 that extend downward from the top deck 38 and are fastened to the top of the heater jaw assembly. The posts 54, 56 extend through sleeves 58, 60 on the top side of the top deck 38. The posts 54, 56 maintain the heater jaw assembly 52 in horizontal registration with the grooves 32 in the base 30. The posts are movable vertically in the sleeves to adjust the spacing between the base and the bottom of the heater jaw assembly 52. Toggle clamps 62, 64 are mounted on the top deck 38.

The upper toggle clamps 62, 64 and the lower toggle clamps 42, 44 each have a lever 66 with a handle 67 pivotally attached to a clamp body 68 at one end and to an end of a clamp arm 70, 71 between the clamp body and the handle. A pressure pad 72 extends from the end of the arm opposite the pivot. The arms 70 of the upper toggle clamps 62, 64 are shorter than the arms 71 of the lower toggle clamps 42, 44. The upper and lower toggle clamps 62, 64, 42, 44 are used to apply downward pressure against the belt as described later. In FIG. 2 the left upper toggle clamp 62 is shown in an open position, and the right upper toggle clamp 64 is shown in a latched position with its pressure pad 72 pushing downward against the post 56 to press the heater jaw assembly 52 downward toward the base 30. Thus, the upper toggle clamps 62, 64 serve as downward pressure-applying devices.

Figure 3:
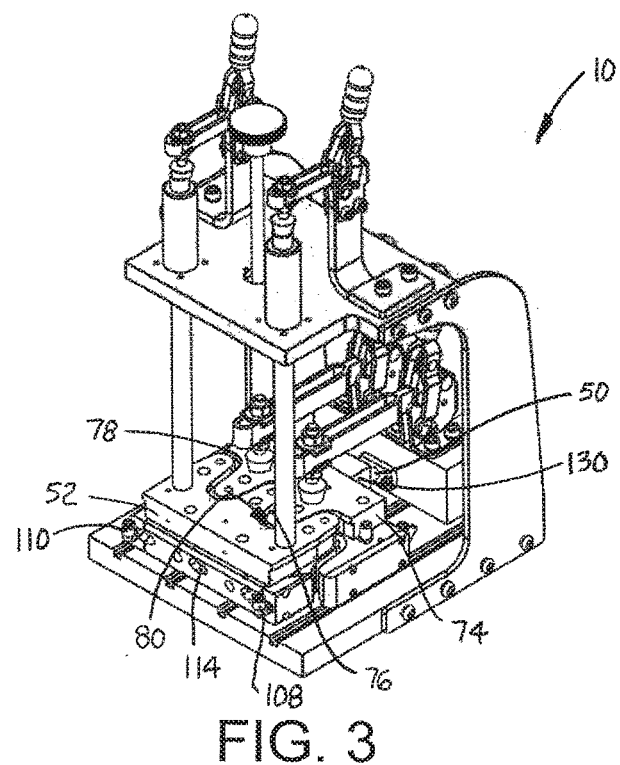
FIG. 3 is an axonometric view of the sidewall bonder of FIG. 1 in a second step of the bonding process with the belt removed for clarity.

A second heater jaw assembly 74 is shown in FIG. 3. Unlike the horizontally fixed first heater jaw assembly 52, the second heater jaw assembly 74 is horizontally movable at least in a direction parallel to the lengths of the grooves 32 in the base 30. The two heater jaw assemblies 52, 74 have confronting vertical faces 76, 78 that are corrugated and complementary and form a corrugated slot 80 to receive a corrugated sidewall.

Figure 6:
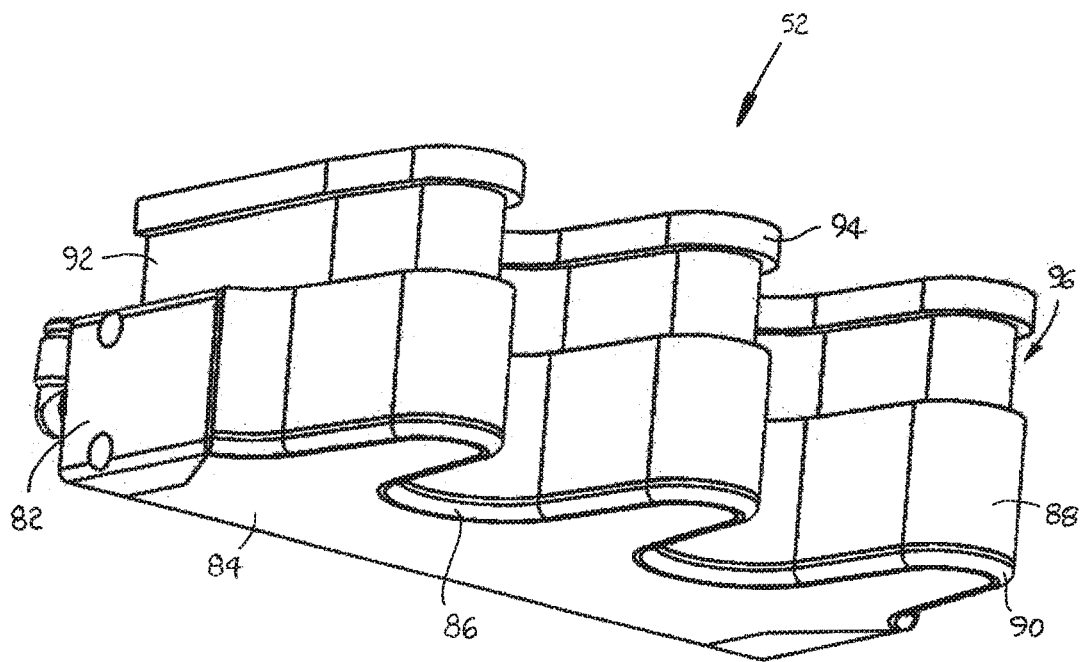
FIG. 6 is an enlarged underside axonometric view of a heater jaw assembly of the sidewall bonder of FIG. 1.

FIG. 6 is an enlarged underside view of the first heater jaw assembly 52. The second heater jaw assembly 74 is similar in construction. The jaw assembly 52 has a lower heating portion 82 comprising an insulating body 84 and a heating element 86. The insulating body 84 may be made of a plastic material rigid enough to hold its shape when exposed to high temperatures. The insulating body 84 may also have a low coefficient of friction for easy separation from a bonded sidewall. Polytetrafluoroethylene (PTFE) or thermoplastic blends including PTFE are examples of low-friction plastic materials the insulating body 84 can be made of. The insulating body 84 has a vertical corrugated face 88 that matches the belt's corrugated sidewall. The heating element 86, which is largely encapsulated in the insulating body 84, has a corrugated bonding strip 90 at the lower end of the vertical corrugated face 88. The bonding strip 90 contacts the separated sidewall and the outer surface of the belt to transfer heat from the heating element 86 to the interface of the sidewall with the belt. A heat sink 92, such as an aluminum heat sink, is mounted atop the lower heating portion 82. The heat sink has a vertical corrugated face 94 that is continuous with or forms a continuation of the vertical corrugated face 88 of the insulating body 84 across a gap 96 formed by an undercutting of the heat sink 92, as shown in FIG. 6. The undercut heat sink 92 minimizes the contact area between the heat sink and the sidewall for easier separation after bonding.

Figure 7:
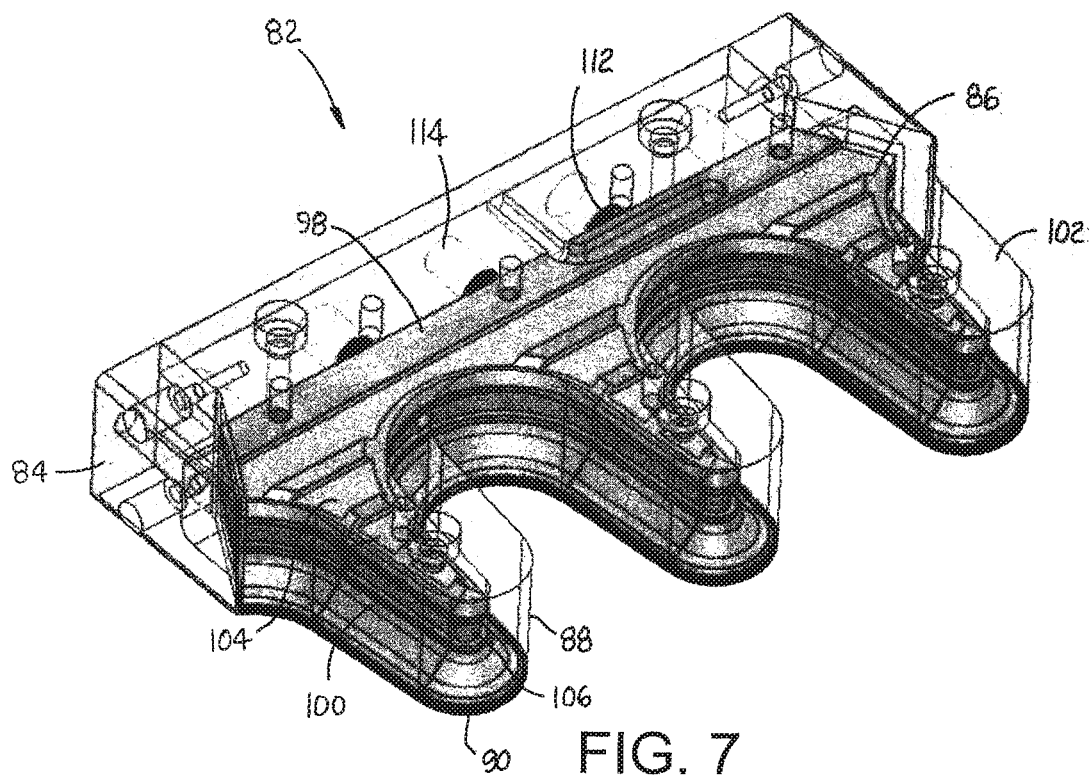
FIG. 7 is an enlarged axonometric view of the lower portion of the heater jaw assembly of FIG. 6 with the housing transparent.

FIG. 7 shows the interior of the lower heating portion 82 with the insulating body 84 transparent. The heating element 86 has a main body 98 from which heating fingers 100 extend into insulating fingers 102 of the insulating body 84. The heating fingers 100 flare out downward to form the corrugated bonding strip 90 that exits the insulating body 84 at the bottom of the vertical corrugated face 88. Slots 104, 106 in the heating element 86 form airflow channels between the heating element 86 and the insulating body 84 to aid the heat sink in removing heat from the heating element and the belt after bonding. Compressed air is pumped into an inlet air fitting 108 in fluid communication with the airflow channels and exits the insulating body 84 through an outlet fitting 110, as shown in FIG. 3. Heater cartridges 112 contacting the main body 98 of the heating element 86 reside in bores 114 in the rear of the insulating body 84. The heater cartridges 112 transfer heat to the heating element 96 and on to the bond site.

Figure 4:
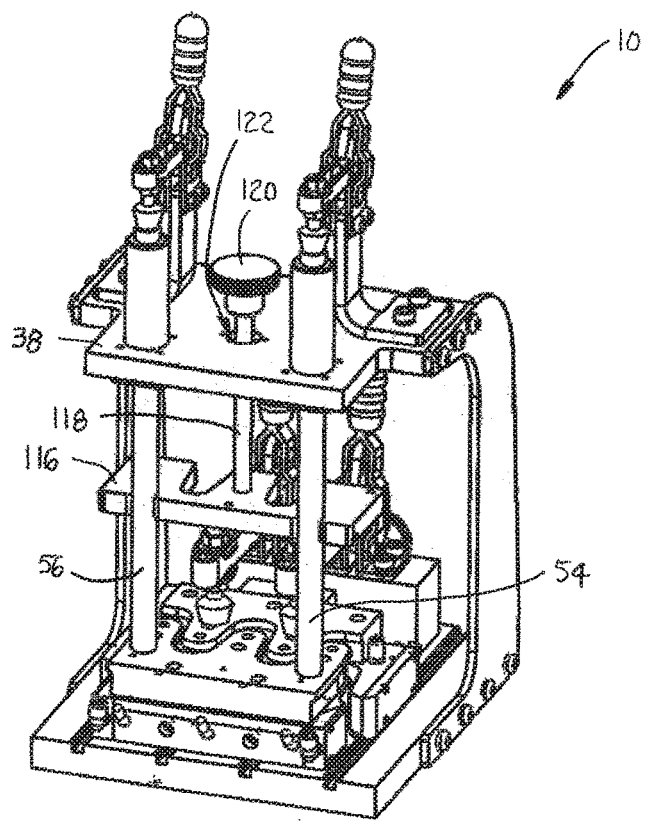
FIG. 4 is an axonometric view of the sidewall bonder of FIG. 1 in a third step of the bonding process with the belt removed for clarity.
Figure 5:
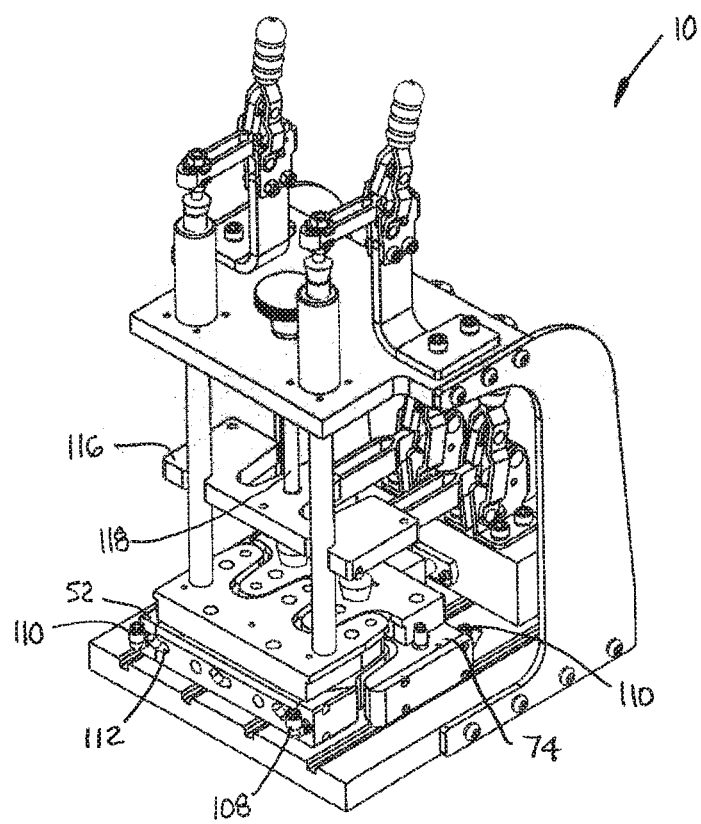
FIG. 5 is an axonometric view of the sidewall bonder of FIG. 1 in a fourth step of the bonding process with the belt removed for clarity.
Figure 8:
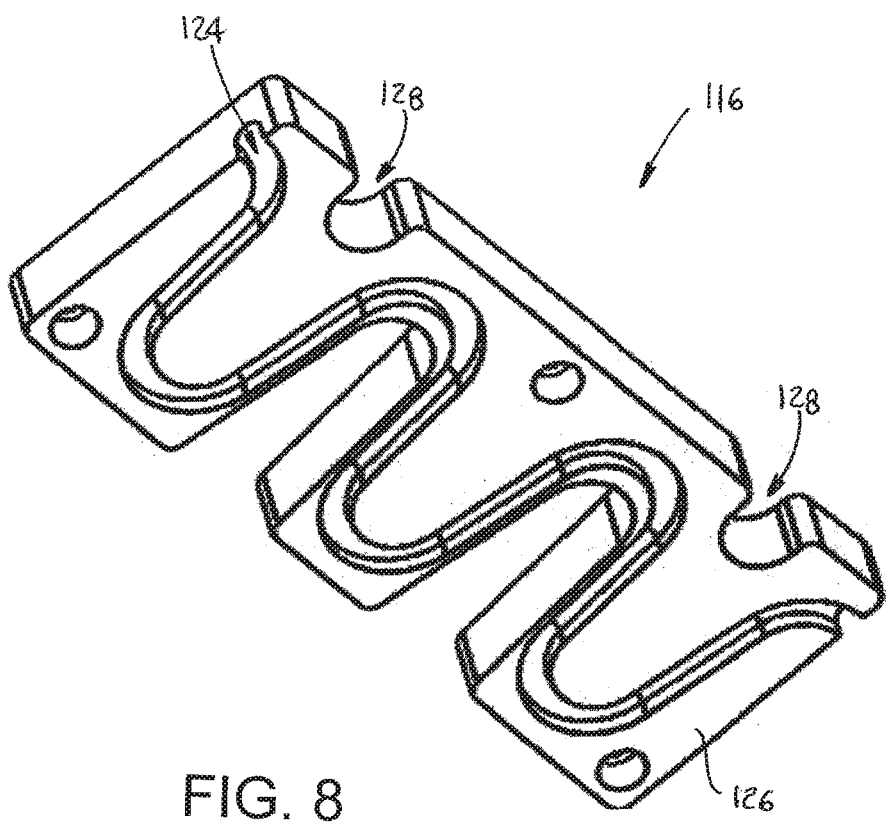
FIG. 8 is an enlarged underside axonometric view of a press plate of the sidewall bonder of FIG. 1.

Another component of the bonder 10 is shown in FIG. 4. A press plate 116 is suspended from the top deck 38 by an attached threaded adjustment rod 118 with an adjustment knob 120. The rod 118 extends through a hole 122 in the top deck 38 and a threaded fitting (not shown, but like the fitting 48 of FIG. 2) at the underside of the deck. The press plate 116 is used to push the sidewall downward against the outer surface of the belt so that enough material is melted to form a robust bond. The rod 118 may have a continuous threading or may have alternating threaded and unthreaded lengths to minimize the amount of turns of the rod required to contact shorter sidewalls. Further details of the press plate 116 are shown in FIG. 8. The press plate 116 has a sinuous groove 124 in a bottom side 126. The sinuous groove 124 receives the top edge of the corrugated sidewall so that a downward pressure is evenly applied to the sidewall during bonding. Notches 128 in the press plate 116 receive the posts 54, 56 and hold the press plate in registration with the first heating jaw 52 and the rest of the bonder components, as shown in FIG. 4.

A method for bonding corrugated sidewalls to a conveyor belt across a splice is described with respect to FIGS. 1-5. Before the bonding process, the sidewall, like the belt body, is typically pre-spliced, but the bottom of the sidewall is separated from the outer surface of the belt at the splice joint and a short distance on either side of the joint. First, the first heater jaw assembly 52 is lifted by the posts 54, 56 to provide room for the sidewalls 12 to fit in the bonder 10 as shown in FIG. 1. During that step, the press plate 116 is removed from the bonder 10 or lifted upward to a position near the underside of the top deck 38, as shown in FIG. 2. The belt's drive bars 20 are received in the grooves 32 in the base 30 with the splice joint 18 midway between the two innermost grooves. The step registers the belt in the bonder. The two posts 54, 56 are then lowered to put the first heater jaw assembly 52 into contact with the outer surface of the belt interior to the sideguard. The two upper toggle clamps 42, 44 are then latched closed to apply downward pressure on the first heater jaw assembly 52 to clamp the belt interior at the sidewall against the base 30. Next, the second heater jaw assembly 74 is manually inserted into the bonder 10 atop the base 30, as shown in FIG. 3. The second heater jaw assembly 74 has a rear block 130 with a dimple (not shown) that receives the threaded adjustment rod 50 and registers the two complementary corrugated jaw assemblies. The corrugated sidewall is then pushed against the vertical face 76 of the first heater jaw assembly. Next, the adjustment rod 50 is turned to push against the second heater jaw assembly 74 and move it toward the first heater jaw assembly 52. The rod 50 is adjusted to apply enough lateral, or horizontal, pressure to maintain the sidewall thickness and prevent melted plastic from running up the sidewall. Thus, the rod 50 serves as a lateral pressure applying device. Then the pressure-applying lower toggle clamps 42, 44 are latched closed to apply downward pressure to the second heater jaw assembly 52 to clamp the outer side of the belt at the sidewall against the base 30. In the next step, illustrated in FIG. 4, the raised press plate 116 is lowered by the pressure-applying threaded adjustment rod 118 against the top edge of the sidewall. The corrugated top edge is manually fed into the sinuous groove 124 (FIG. 8), and then the press plate 116 is lowered further, as in FIG. 5, to apply enough downward pressure against the sidewall to ensure that enough material is melted to for a good bond. The heater cartridges 112 of both heater jaw assemblies 52, 74 are energized, the heat flows to the bottom bonding strips, and to the bond site on both sides of the sidewall bottom.

When the time required for the bond to form elapses, the heater cartridges are de-energized, and air is pumped through the air inlets 108 of both heater jaw assemblies 52, 74, through the airflow channels, and out the outlets 110 to accelerate the cooling of the heating elements and the bond. To remove the belt from the bonder, the press plate 116 is lifted out of the way. The lower toggle clamps 42, 44 are released, and the horizontal pressure adjustment rod 50 is retracted to allow the second heater jaw assembly 74 to be removed from the bonder. The upper toggle clamps 62, 64 are released, and the first heater jaw assembly 52 raised so that the sidewall belt can be removed from the bonder 10.

Although one version of a bonder has been used in this description, other versions are possible. For example, the toggle clamps, which are used to apply a vertical downward pressure against the jaw assemblies to clamp the belt to the base of the bonder could be replaced by other pressure-applying devices, such as linear actuators, solenoids, springs, ratchets, and threaded adjustment rods, to name a few. And the adjustment rods could also be replaced by other pressure-applying devices, such as those just listed. The bonder can also be used to bond sidewalls to flat belts with no drive bar. In that case registration can be done manually. And the bonder also would work with reinforced belts.

What is claimed is:

1. A bonder for bonding a corrugated sidewall section to a thermoplastic belt, comprising:
    a base on which a length of a thermoplastic belt with a corrugated sidewall section separated from an outer surface of the thermoplastic belt rests;
    a first heater jaw assembly above the base and having a vertical corrugated face and a heating element having a bonding strip along the bottom of the vertical corrugated face;
    a second heater jaw assembly above the base and having a vertical corrugated face and a heating element having a bonding strip along the bottom of the vertical corrugated face;
    wherein the vertical corrugated faces of the first and second heater jaw assemblies are complementary and confronting each other across an intervening corrugated slot in which the corrugated sidewall section is received;
    wherein the first and second heater jaw assemblies are disposed on the outer surface of the thermoplastic belt on opposite sides of the corrugated sidewall section;
    wherein the heating elements of the first and second heater jaw assemblies transfer heat to the bonding strips to melt the bottom of the corrugated sidewall section on the opposite sides to bond the corrugated sidewall section to the outer surface of the thermoplastic belt.

2. A bonder as in claim 1 further comprising a pressure plate and a downward pressure-applying device applying pressure downward against the pressure plate in contact with the top edge of the corrugated sidewall section to push the corrugated sidewall in the corrugated slot against the outer surface of the thermoplastic belt.

3. A bonder as in claim 1 wherein the first and second heater jaw assemblies each include a low-friction insulating body forming the vertical corrugated face.

4. A bonder as in claim 1 wherein the first and second heater jaw assemblies each include a heat sink having a vertical corrugated face.

5. A bonder as in claim 1 wherein the first and second heater jaw assemblies each include cooling airflow channels along the heating element.

6. A bonder as in claim 1 further comprising a lateral pressure-applying device applying a lateral pressure against the second heater jaw assembly to push it toward the first heater jaw assembly and hold the corrugated sidewall section between the vertical corrugated faces.

7. A method for bonding a separated section of a corrugated sidewall to a thermoplastic belt, the method comprising:
    clamping a thermoplastic belt between a base and a first heater jaw assembly having a corrugated vertical face with a corrugated bonding strip at the bottom against an outer surface of the thermoplastic belt inward of a corrugated sidewall;
    pushing a corrugated sidewall section separated from the outer surface of the thermoplastic belt against the corrugated vertical face of the first heater jaw assembly;
    pushing a second heater jaw assembly having a corrugated vertical face confronting and complementary with the corrugated vertical face of the first heater jaw assembly and a corrugated bonding strip at the bottom to form a corrugated slot receiving the corrugated sidewall section;
    clamping the thermoplastic belt between the base and the second heater jaw assembly against an outer surface of the thermoplastic belt outward of the corrugated sidewall;
    applying downward pressure against the corrugated sidewall section in the corrugated slot;
    heating the corrugated bonding strips of the first and second heater jaw assemblies to melt the bottom of the corrugated sidewall section on both sides and bond it to the outer surface of the thermoplastic belt.

8. The method of claim 7 further comprising flowing air through the first and second heater jaw assemblies after heating.

* * * * *